H. Gilbert,
Vapor Burner.
No. 62,024.          Patented Feb. 12, 1867.
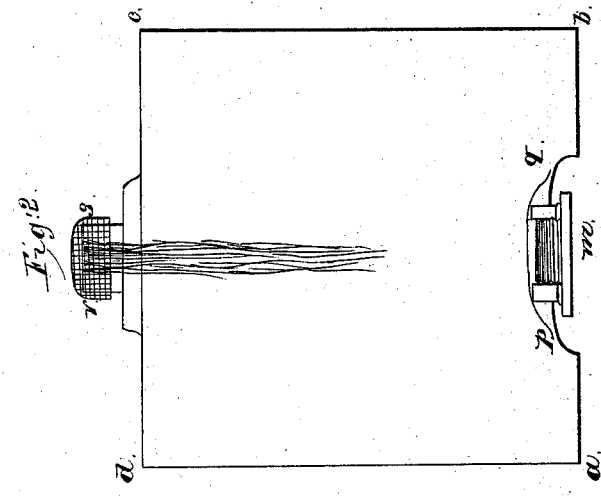
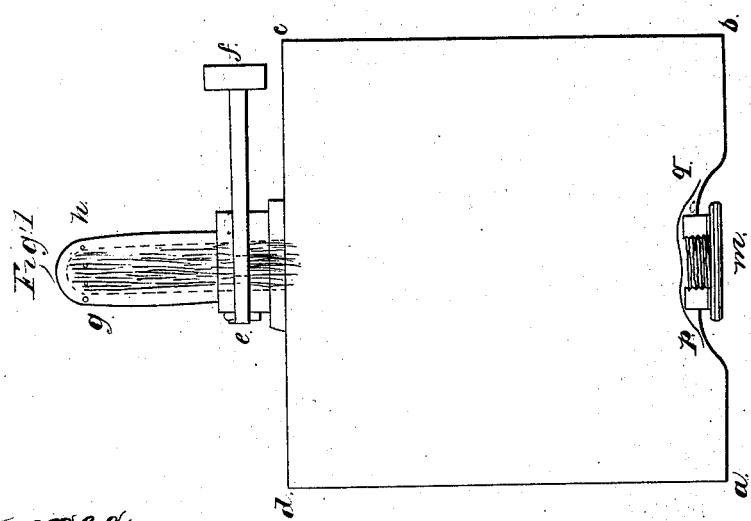
Witnesses:
Leopold Adams
P. H. Van der Weyde, M.D.
Inventor:
Henry Gilbert.

United States Patent Office.

HENRY GILBERT, OF PHILADELPHIA, PENNSYLVANIA.

*Letters Patent No. 62,024, dated February 12, 1867.*

---

IMPROVEMENT IN VAPORIZING AND BURNING GASOLINE FOR HEATING AND ILLUMINATING.

---

*The Schedule referred to in these Letters Patent and making part of the same.*

---

Be it known that I, HENRY GILBERT, of the city of Philadelphia, State of Pennsylvania, have invented an Improvement in Vaporizing and Burning Gasoline for Heating and Illuminating Purposes, the nature of which consists in overcoming the defects of the preceding, patented by William Besche, August 14, 1866, No. 57,245.

These defects are, first, the fitting of part of the burner and part of the body of the lamp with wire gauze, which, being too good a conductor of heat for this purpose, causes, very often, an explosive spitting of the flame; second, the fitting of the vent of the burner with asbestos, which, possessing too little porosity, chokes up the liquid and also causes the lamp to refuse taking fire before the burner is for a long time exposed to a flame and considerably heated; third, the absence of the possibility of regulating the flame; consequently, stronger the lamp burns, stronger the heat, and stronger the evaporation, and stronger the flame; and so the lamp will sometimes go on burning with a continually increasing intensity before it becomes regular, and then burns with a flame larger than is sometimes desired.

The first objection I overcome by omitting the wire gauze in the lamp, as well as in the burner, and filling it all with saw-dust, or substituting for this, in the burner, a well-fitting piece of charcoal, rattan, cotton, wool, hemp, flax, jute, or other equivalent porous material. The second objection I overcome by discarding the asbestos, not only as useless, but as decidedly injurious. The third objection I overcome by adding to the burner a stop-cock or other similar contrivance, in order to regulate the supply of gasoline vapors.

In order to enable others skillful in these matters to use my improvement, I give here a full description in illustration of the annexed drawings.

$a\ b\ c\ d$ represent the body of the gasoline safety-lamp in its present most improved style, but which may have any desired shape. It is entirely filled with saw-dust. $g\ h$ is the burner, provided at its lower part with a regulating stop-cock, $e f$. The burner is filled with saw-dust, cotton, charcoal, or any of the mentioned materials. As the filling of the lamp above is very objectionable, an opening below is provided for, closed with a screw-top, with or without a valve, and represented by $m$. Inside of the opening is a piece of wire gauze, $p\ q$, serving to prevent the saw-dust from falling out when the screw is removed for the purpose of filling the lamp, which, of course, is done by reversing it. Figure 2 represents a lamp where the metallic burner is entirely omitted and its place supplied by a little cup, $r\ s$, of fine wire gauze, through which the vapors from the wick escape and burn. In the openings of cans, tanks, barrels, etc., I use a bundle of metallic wire in place of the rolled-up wire gauze, as giving a better passage to the liquid, and increased safety.

What I claim as my invention, and wish to secure by Letters Patent, is—

1. The screw-stop, with or without valve at the bottom, intended to fill the reservoir or vessel with the combustible fluid from below.

2. The stop-cock or its equivalent in the burner, serving to regulate the exit of gasoline vapors, and consequently the size of the flame.

3. The filling of the lamp or burner, or both, with saw-dust, charcoal, powdered or otherwise, bone-dust, cotton, flax, hemp, wool, rattan, jute, or other similar porous substance.

4. The modification of said lamp by omitting the metallic burner entirely and burning it by means of a wick, covered or not covered by a cap of wire gauze, or by burning it without any wick by means of the metallic burner.

5. The use of a bundle of fine metallic wire in the openings and stop-cocks of cans, bottles, tanks, barrels, or other reservoirs for fluid combustible substances, giving a better ingress and egress to the liquid material than is the case with wire gauze, and acting as an improved safety arrangement in preventing any flame to communicate to the interior and cause explosions.

In testimony whereof I have signed my name to this specification in the presence of two subscribing witnesses.

H. GILBERT.

Witnesses:
 LEOPOLD FRANS,
 P. H. VANDER WEYDE.